(12) United States Patent
Schuchman

(10) Patent No.: US 8,033,518 B2
(45) Date of Patent: Oct. 11, 2011

(54) BEVERAGE HOLDER DEVICE

(76) Inventor: Kurt Cameron Schuchman, Jourdanton, TX (US)

( * ) Notice: Subject to any disclaimer, the term of this patent is extended or adjusted under 35 U.S.C. 154(b) by 222 days.

(21) Appl. No.: 12/380,973

(22) Filed: Mar. 6, 2009

(65) Prior Publication Data

US 2010/0084531 A1    Apr. 8, 2010

Related U.S. Application Data

(60) Provisional application No. 61/195,579, filed on Oct. 8, 2008.

(51) Int. Cl.
*A47K 1/08* (2006.01)
(52) U.S. Cl. .................. 248/311.2; 248/214; 248/309.1; 224/679
(58) Field of Classification Search ............... 248/311.2, 248/224.7; 224/679, 677
See application file for complete search history.

(56) References Cited

U.S. PATENT DOCUMENTS

| | | | | |
|---|---|---|---|---|
| 2,926,879 A * | 3/1960 | Dietrich | ..................... | 248/311.2 |
| 4,191,350 A * | 3/1980 | Ormond | ................... | 248/292.13 |
| 4,697,780 A * | 10/1987 | Wenkman et al. | ............ | 248/558 |
| 4,721,276 A * | 1/1988 | Moss | ......................... | 248/311.2 |
| 5,857,601 A * | 1/1999 | Greenwood | .................. | 224/409 |
| 6,006,969 A * | 12/1999 | Kim | .............................. | 224/197 |
| 6,283,348 B1 * | 9/2001 | Wang | ........................... | 224/271 |
| 7,458,489 B1 * | 12/2008 | Mudd et al. | ................... | 224/197 |

* cited by examiner

*Primary Examiner* — Amy J Sterling

(57) ABSTRACT

An attachment (A) coupled to a belt clip (B) including a rigid beverage holder frame, and a catch and catch release belt or appliance clip device. The beverage holder comprising a free swinging, rigid, cylindrical frame to perpendicularly harbor a beverage container (C) contained within or not an insulated drink container sleeve (E) attaching to belt clip device (B), providing the wearer convenient mobile storage while minimizing tipping spills and further providing the user freedom of either or both hands for other activities or tasks.

1 Claim, 5 Drawing Sheets

BEVERAGE HOLDER DEVICE

CROSS REFERENCE TO RELATED APPLICATIONS

This application claims the benefit of U.S. Provisional Patent Application No. 61/195,579, filed Oct. 8, 2008, the entire disclosure of which is considered as part of the disclosure of the present application and is hereby incorporated by reference herein.

STATEMENT REGARDING FEDERALLY SPONSORED RESEARCH OR DEVELOPMENT

Not Applicable

BACKGROUND

1. Field of Invention

This beverage holder device comprises a free swinging cylindrical frame beverage cup holder to harbor a beverage container either encased within an insulated beverage container sleeve or not, coupling to a belt clip device, providing convenient user mobile storage while minimizing spills and providing the user freedom of either or both hands for other activities or tasks.

2. Description of Prior Art

There have been many devices engineered and manufactured for the hands free containment of individual serving drink containers. A majority of these "beverage holders" are specifically designed as utility attachments for arm rests, chair backs, automobile consoles, water craft frames, handicap crutches, baby strollers, and cribs. One device is similar in theory but the physical, structural and effect differences are profound.

Collapsible article holders are known. As example, U.S. Patent Application 20080047986 by Will, Loring, Honerkamp, and Joseph, published date Feb. 28, 2008, describes a collapsible insulated collar with a flexible fold over bracket that forms a belt loop that can be stored in a users' pocket.

(a) The concept of such a collapsible device and accompanying hardware being capable of being stored in a users' pocket suggests impracticality.

(b) Collapsible beverage holder containers are subject to accelerated material fatigue at typical folding stress points and further subject to wear and material failure with repeated use.

(c) Attachment grommets, hooks and loops, snap buttons, mounting plates, etc., attachment points or anchoring media are equally subject to material fatigue and material failure with repeated use. That being said, durability and continued functionality issues of attaching closure hardware to collapsible material are evident.

(d) The extended length of the fold over bracket of such a device also suggests when used in a manner of the fold over bracket attaching to a belt coupling device, in its' extended character, clearly places the drink container far enough below the centerline of the wearers torso impacting removal and further demonstrating the potential interference of the negative vertical and horizontal (anterior, posterior, and sideward) angles created by drop distance and/or the resulting pivotal shifting of the collapsible beverage holder upon the wearers attempt at drink container removal.

(e) When used in a manner with the pivotal post extended to full length and attached to a belt device, friction produced between the wearers' clothing and the device would likely influence and effect radical pivoting of the beverage holder and potential spillage of the beverage.

(f) Attaching a collapsible insulated sleeve to a belt mounted container holder bracket also demonstrates that removing a beverage container from the friction producing insulated sleeve or when confronting the effect of less then a 180 degree perpendicular drink container retrieval lift, would likely require the use of both hands, one hand to lift the drink container, the second hand to secure the collapsible insulated drink container sleeve; being a drink container such as a 12 ounce beverage can would pose significant retrieval issues each time the wearer attempted to remove the drink container from the device. Likewise, when harboring a standard size, long neck bottle, a similar negative effect would likely take place.

(g) Removing a drink container from this devices' insulated collar substantially defeats the convenience and function of the ambient temperature impact design.

(h) Actions required to adjust the diameter of such a device to accommodate the diameters of various drink containers may negatively effect the value of other proposed benefits.

(i) Equally, any of the above or combination of the above conditions or results may be of such significant and substantial negativity as to seriously impair or limit the value of any or all of the desired benefits.

Rigid article holders that are attached to rigid frames are known. As examples, U.S. Pat. No. 5,385,325, to Rigsby, Jan. 31, 1995, describes an adjustable container holder housing having a first and second set of grasping jaws within the housing attaching to a rigid frame. U.S. Pat. No. 5,803,327, to Nipper et al, Sep. 8, 1998, describes an article container that is attached to the rigid frame of a handicap crutch. U.S. Pat. No. 6,837,471, to Izume, Jan. 4, 2005, describes a cup holder device which includes a case that attaches to the rigid frame of a baby stroller.

The prior art references does not contain any suggestion, express or implied, that they be combined, or that they be combined in any manner.

That being presented, this beverage holder device invention is designed and accomplishes a significant and substantial improvement to the art, being a beverage holder device comprising a rigid and durable cup holder frame, coupling to a catch and catch release belt clip designed to accommodate drink containers either encased within or without personal insulated drink container sleeves.

(a) Said beverage holder device is of predetermined size, omitting the need for accommodating adjustments to the frame diameter or swiveling bracket.

(b) Said beverage holder device is of rigid and impervious material design.

(c) Said beverage holder device is durable and manufactured of long lasting material.

(d) Said beverage holder device is of one piece construction.

(e) Said beverage holder device is of a length that allows the wearer comfort in a sitting or seated position.

(f) Said beverage holder device is of a length that promotes an independent free swivel axis upon the pivotal point coupling the beverage holder frame and the wearer mounted belt clip.

(g) The diameter of said beverage holder devices' containment annular frame allows ease of use for a single hand retrieval of any contained drink container either within or without an attached insulated drink container sleeve present on the drink container.

(h) Said beverage holder device maintains a perpendicular centerline responding to gravity.

(i) Said beverage holder device maintains an independent pivot point of vertical or perpendicular position not negatively influenced by routine or normal body movement.

(j) Said beverage holder device reduces the potential negative effect of friction produced by the wearers' clothing upon the cup holder frame, minimizing radical or undesirable device movement.

(k) Said beverage holder device does not require the removal of a insulated drink sleeve or exposes the beverage container to ambient elements when either docking or retrieval of a beverage container from the beverage frame device.

(l) Said beverage holder device ensures that a beverage container when contained within a insulated drink sleeve allows for the continued temperature maintenance benefit of the insulated drink sleeve preventing exposure of the contents to either undesirable ambient temperature gain or loss.

(m) Said beverage holder device responds to a trend of demand and maintains continual non-seasonal consumer interest by satisfying an existing need for such a durable, one piece, rigid, hand freeing device.

(n) Said beverage holder device also demonstrates the potential for a reduction in litter as the device conveniently contains and transports the empty drink container for later proper solid waste disposal or recycling.

(o) Said beverage holder devices' rigid and durable belt attachment with beverage holder device attaches to a person or appliance, employing a pivotal, spill preventing, axial point of partial rotation relative to the position of the device wearer or appliance.

(p) Said beverage holder device includes a rigid, one piece, open top, oblate solid or cross member weave bottom plate, cylindrical frame coupling to a pivotal point, cylindrical post and cylindrical stud button attaching to an inverted, U shaped clip spring hinged, clip release belt attachment combining to create and produce an unique hands free, spill preventing, personal drink container holder.

This invention relates to the temporary docking, storage and transport of an individual serving personal or commercial drink container within a swiveling, open top, oblate solid or cross member weave bottom plate, cylindrical frame attached to a belt or appliance by means of an inverted, U shaped clip spring hinged, belt clip containing an appropriate catch and catch release action. This device allows users to task or multitask with free use of one or both hands while their individual serving personal or commercial drink container is temporarily harbored on their person. The beverage container is placed into and contained vertically within the self leveling, gravity spill and tipping resistant cylindrical frame of the device, allowing the user to retrieve the beverage container with the action of a single handed retrieval.

Consumers of single serving or multiple serving beverage containers, whether in a work or recreational environment, must often place or dock the drink container on a flat surface to allow the consumer the use of either or both hands. In the interest of drink consumption, this confines consumer mobility to the drink docking area or if the task results in the necessity of consumer mobility, requires the consumer to either transport the drink container or later return to the drink docking area to retrieve the drink container. This temporary "set-down" requirement of individual serving drink containers continues to represent negative motion and consumer nuisance. This "set-down" beverage management issue increases the potential for container tipping upsets and/or premature warming or cooling of drink temperatures.

Consumers have been plagued for centuries with "what to do with that beverage container" when the task requires free use of one or both hands. This invention eliminates the necessity of that concern when the consumer is confronted with a duty or task requiring the free use of either or both hands.

BRIEF SUMMARY OF THE INVENTION

The present invention is directed to a one piece, self leveling, gravity spill and tipping resistant swiveling, open top, oblate solid or cross member weave bottom plate, cylindrical beverage holder device frame coupling to a catch and catch release clip device mounted to or on a belt, clothing, or appliance, allowing that when a beverage container encased within an insulated drink sleeve or not, is vertically harbored within the cylindrical frame and attached to the belt clip, ensuring the consumer the free use of either or both hands, while not requiring that the beverage be placed in a "set-down" location.

The utility of this invention allows consumers the advantage of retaining the option of mobility, the personal or commercial beverage or drink container being securely harbored on their immediate person within a spill and tipping resistant harborage, freeing the consumer for tasks requiring unimpaired usage of either or both hands.

The present invention comprises two basic parts: a detachable inverted U-shaped spring hinged, catch and catch release belt, clothing or appliance clip, or another embodiment of an attaching device for connecting to a one piece, cylindrical beverage holder frame; and a one piece, open top, oblate solid or cross member weave bottom plate, cylindrical beverage holder frame with a connective swivel point, stud button. The cylindrical holder frame and catch and catch release belt clip may be of one piece molded synthetic or resin material construction, and/or of molded, extruded, tooling, die machine or cast manufactured components, or any combination of molded synthetic or resin material, extruded, tooled, die, and machined or cast components, that assemble to create the beverage holder cylindrical frame and cylindrical pivot stud button and catch and catch release belt clip.

The oblate solid or cross member ribbed bottom plate may be of any thickness to sufficiently counterweight gravity ensuring the vertical position of the harbored drink container. The annular ring diameter is of a predetermined size. This device may be of any color or tint. This beverage holder device may also incorporate the use of non-conductive insulated material features. This beverage holder device has certain elements that can be eliminated or duplicated, changed in size, connected or associated with its adjacent elements in a different manner, or made integrally or separately. However, those skilled in the art will appreciate that belt attachment device and cylindrical frame can also have other configurations as well.

BRIEF DESCRIPTION OF SEVERAL VIEWS OF THE DRAWINGS

The objects of the invention are achieved as set forth in the illustrative embodiments shown in the drawings, which form a part of the specification.

Corresponding reference characters indicate corresponding parts throughout the several views of the drawings.

DETAILED DESCRIPTION OF THE INVENTION

The following detailed description illustrates the invention by way of example and not by way of limitation. This description will clearly enable one skilled in the art to make and use the invention, describes several embodiments, adaptations, variations, and uses of this invention, including what I presently believe is the best mode of carrying out this invention. As various changes could be made in the above construction without departing from the scope of the invention, it is intended that all matter contained in the above description or shown in the accompanying drawings shall be interpreted as illustrative and not in a limiting sense.

This invention is of a swiveling, open top, oblate solid or cross member weave bottom plate, cylindrical structured frame which may achieve the potential and design of the invention by either being comprised of one singular unit, a unit comprised of an open top, oblate solid or cross member weave bottom plate, cylindrical frame and connecting component swivel and catch and catch release belt clip, or other joining component assembly consistent with the potential and intent of the design. However, those skilled in the art will appreciate that this device can have other configurations as well.

Figure 1:
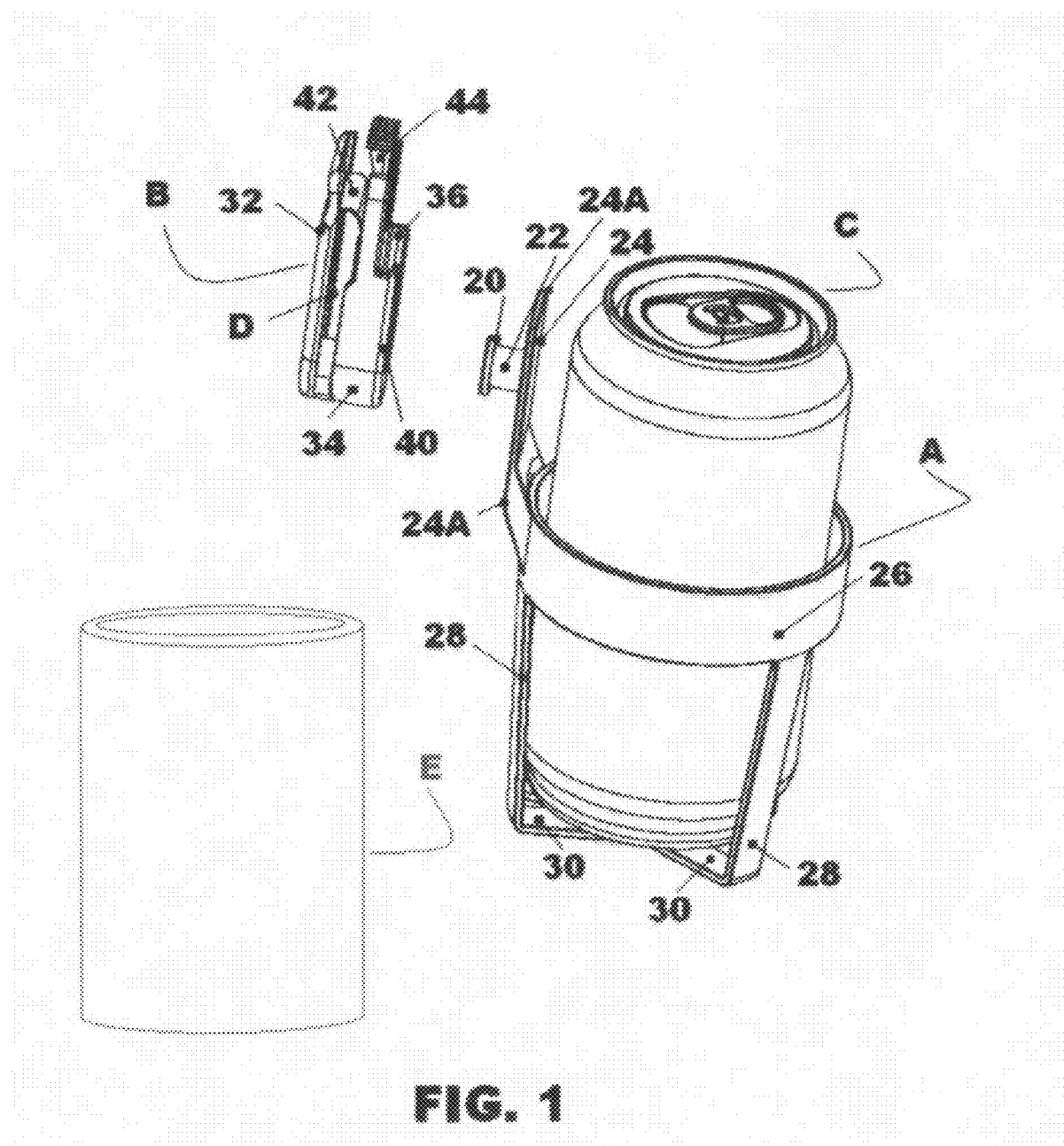
FIG. 1 is a perspective view of a conventional personal or commercial beverage or drink container C perpendicularly harbored within the frame work of a swiveling, open top, oblate solid or cross member weave bottom plate, cylindrical beverage holder frame A coupling to a inverted U-shaped spring hinged catch and catch release clip B.

Referring to the drawings, FIG. 1, attachment A of the present invention is shown containing a personal drink container C which perpendicularly mounts to or on a consumers' waist belt or appliance catch and catch release belt clip B belt or appliance channel D within a inverted U-shaped spring hinged belt clip B whereas a stud track channel 36 formed within a U shaped opposing rail retainer 40 receiving and coupling a mesial post 22 and a distal cylindrical stud button 20 affixed to or integrated in a vertical frame member bracket 24 of a breech plane of vertical member bracket 24A to achieve a pivotal embodiment. Beverage cup holder A is released from belt clip B by a downward hand or finger pressure or motion exerted upon belt clip B sear release plunger 44 retracting a retention sear 38.

Referring to the drawings, FIG. 1, attachment A details a single serving individual beverage container C docked within the invention. The illustration depicts the reception and positioning achievement of a single serving beverage container C within the inventions' cylindrical frame A. FIG. 1, attachment A also depicts the point of stabilization and pivot by a distal cylindrical stud button 20 and mesial post 22 pivotal axis of the invention compensating gravitational movement, restricting and limiting the degree of the oblate solid or cross member weave bottom plane 30 radial arc and resultant effect upon the free fluids contained within the beverage container, minimizing the potential for escape of free fluids through the beverages' fluid dispensing opening.

Figure 2:
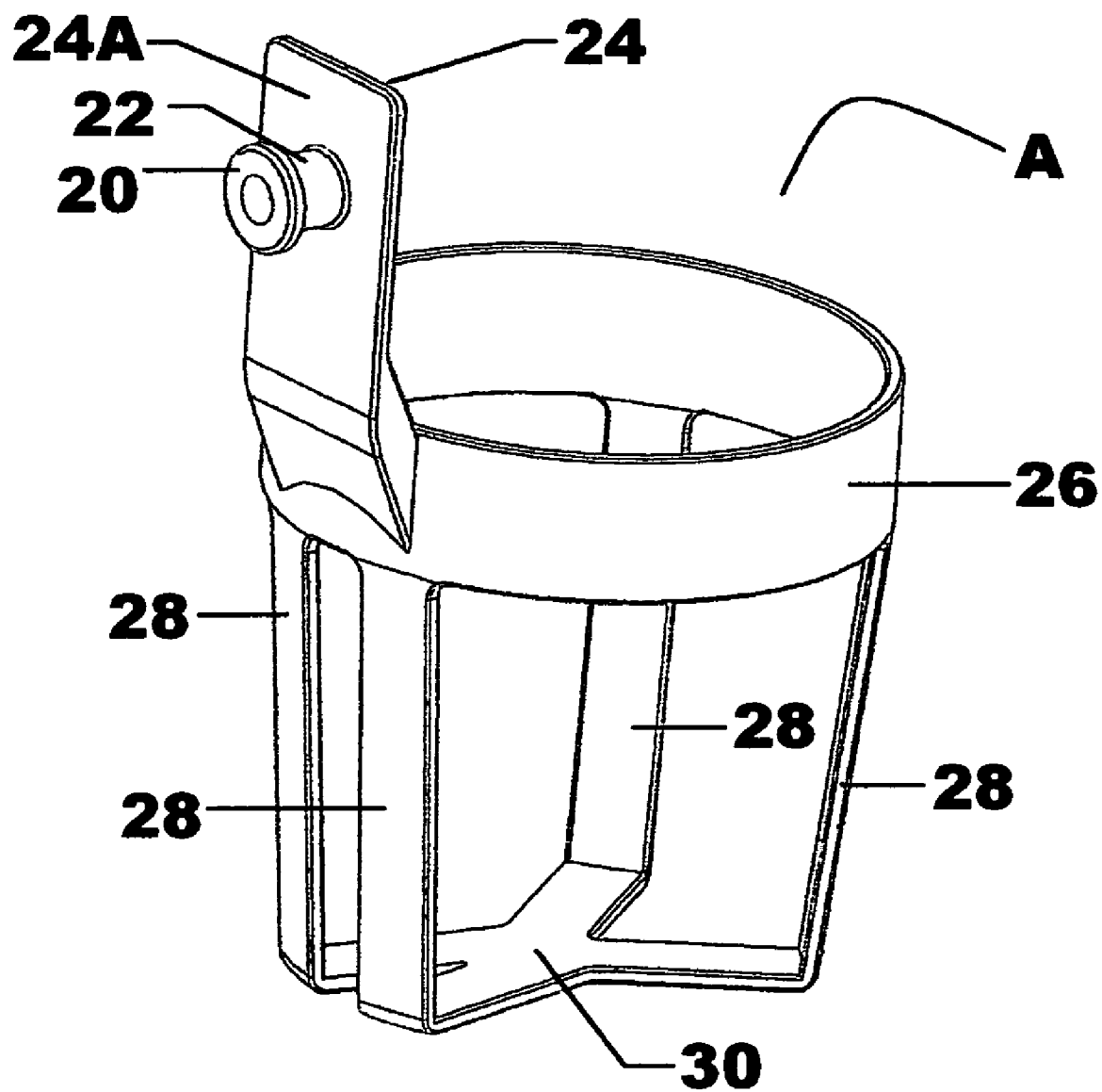
FIG. 2 is a perspective view of a swiveling, open top, oblate solid or cross member weave bottom plate, cylindrical beverage holder frame.

Referring to FIG. 2, attachment A of the present invention comprises a main annular frame ring 4, attached to a circular, oblate solid or cross member weave bottom plate 30 by opposing or proximal rib panels 28 of equal vertical length and width, a vertical frame member bracket 24 ascending from annular ring 26, a mesial cylindrical post 22 and distal cylindrical stud button 20 attachment mounted at a right angle to or formed to the breech plane 24A of vertical frame member bracket 24, effecting the axis of the combined gravity swivel point and coupling point.

Bracket 24 descends into a right angle horizontal annular ring 26 mid-point of the ring structure, from which further descend vertical rib panels 28 which extend a predetermined distance in a downwardly direction forming a cylindrical slotted annular frame and to join into a oblate solid or cross member weave bottom plate 30. This invention couples to or within a inverted U-shaped flat spring hinged belt catch and release clip device B stud track channel 36 formed within a U shaped opposing rail retainer 40 by a main frame projecting mesial post 22 and a distal cylindrical stud button 20.

Figure 3:
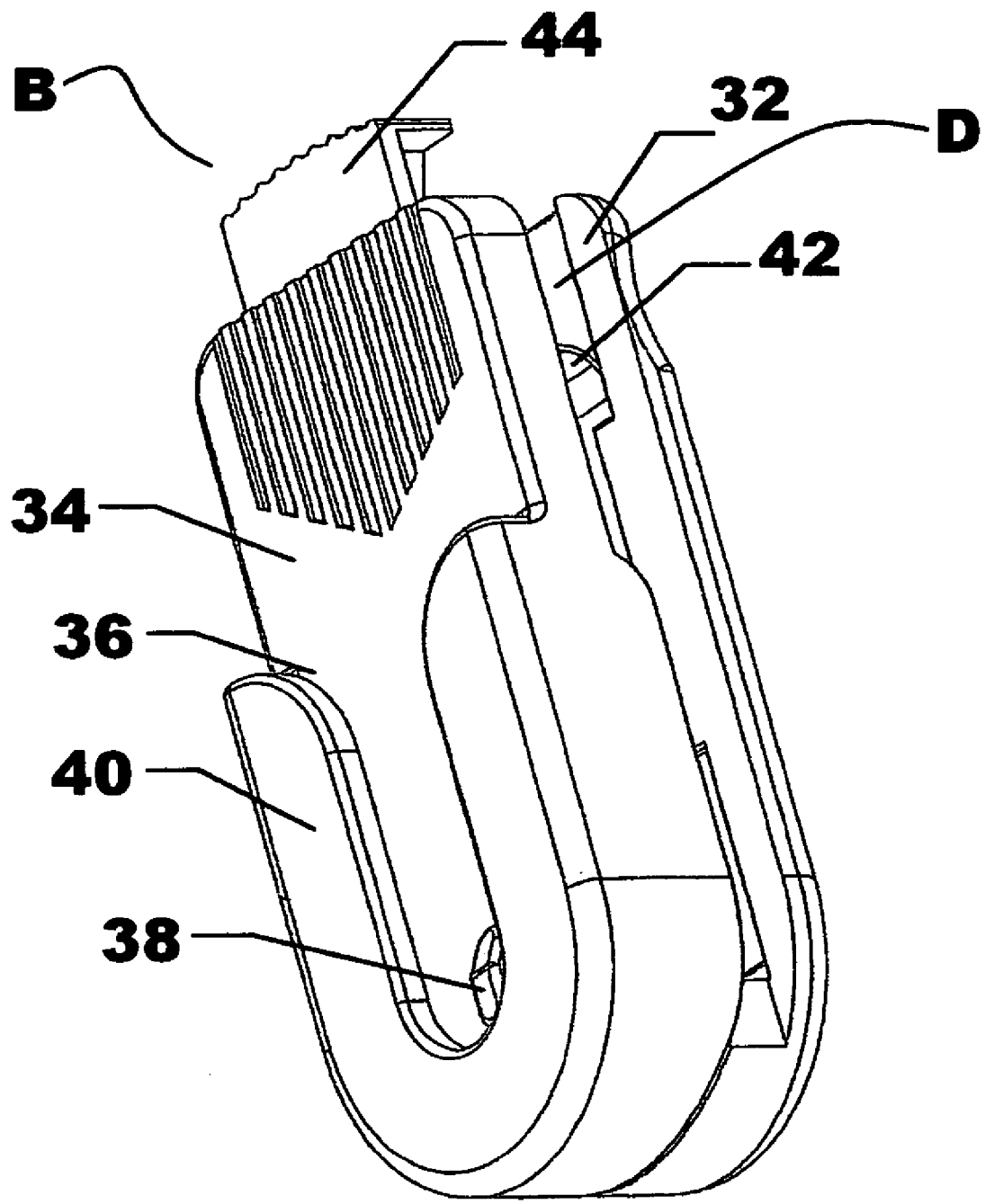
FIG. 3 is a perspective view of a inverted U-shaped spring hinged catch and catch release clip and belt channel D.

Referring to FIG. 3, attachment A a belt mounted, catch and catch release belt clip device B may be a unit of molded plastic and formed metal components, consisting of a two-part, inverted U-shaped spring (42) hinged housing frame front 34 and frame back 32, the parts of which when joined result in a belt or appliance channel D, and further a stud track channel 36 formed within a U shaped opposing rail retainer 40, and a catch and catch release action created by a helical tension spring 46 not shown, a sear release plunger stem 44, and a sear 38.

Figure 4:
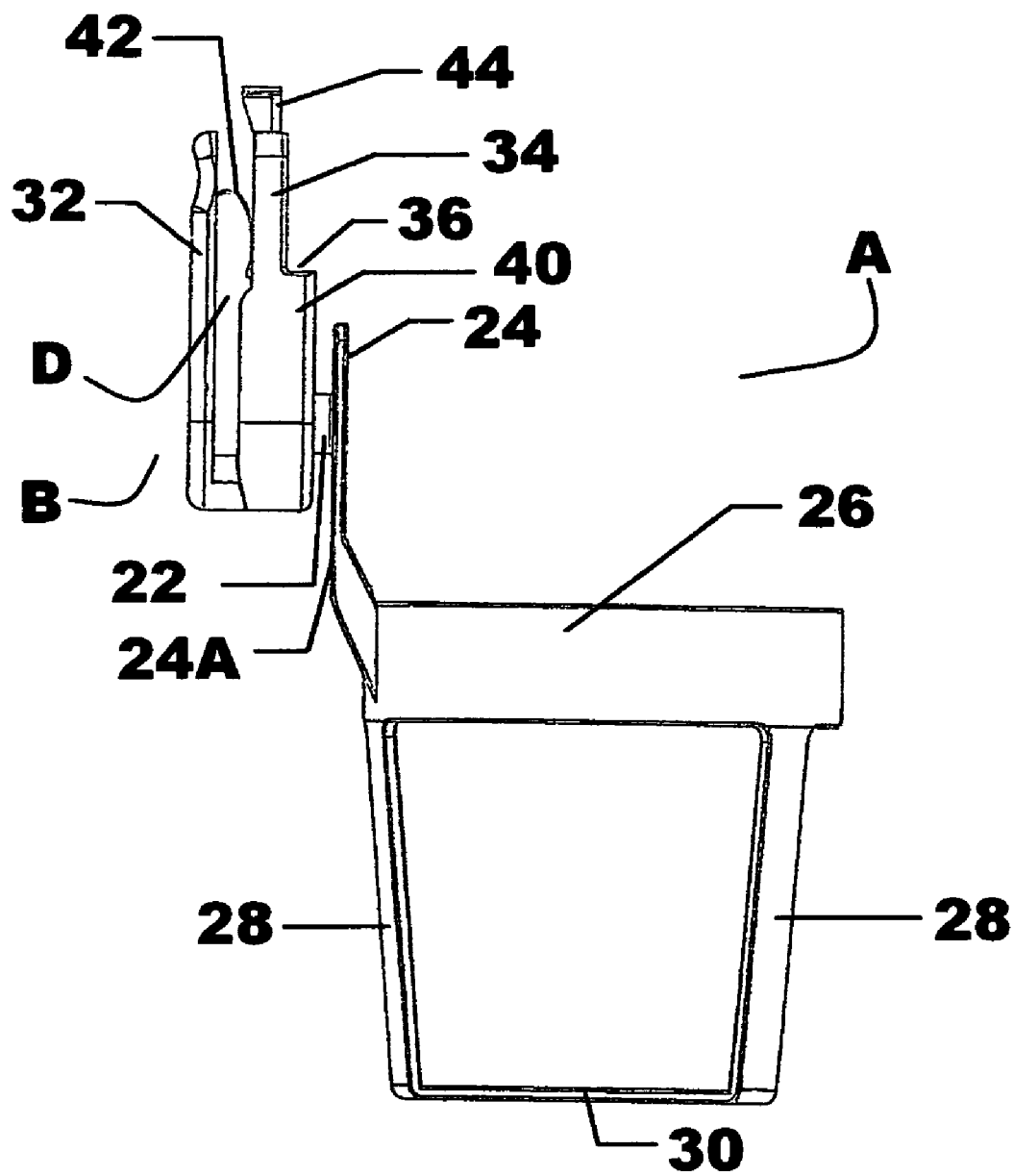
FIG. 4 is a side elevation view of a swiveling, open top, oblate solid or cross member weave bottom plate, cylindrical beverage holder frame coupling to a inverted U-shaped spring hinged catch and catch release belt clip.

FIG. 4, attachment A comprises a belt channel D, a catch and catch release belt clip device B which attaches to the wearers' belt or appliance by clamping on the belt or appliance presence in belt channel D, and couples and secures to the connected cylindrical vertical frame device A by means of a projecting mesial post 22 and distal cylindrical stud button 20; mesial post 22 and distal cylindrical stud button 20 engaging in a stud track channel 36, formed within a U shaped opposing rail retainer 40.

Figure 5:
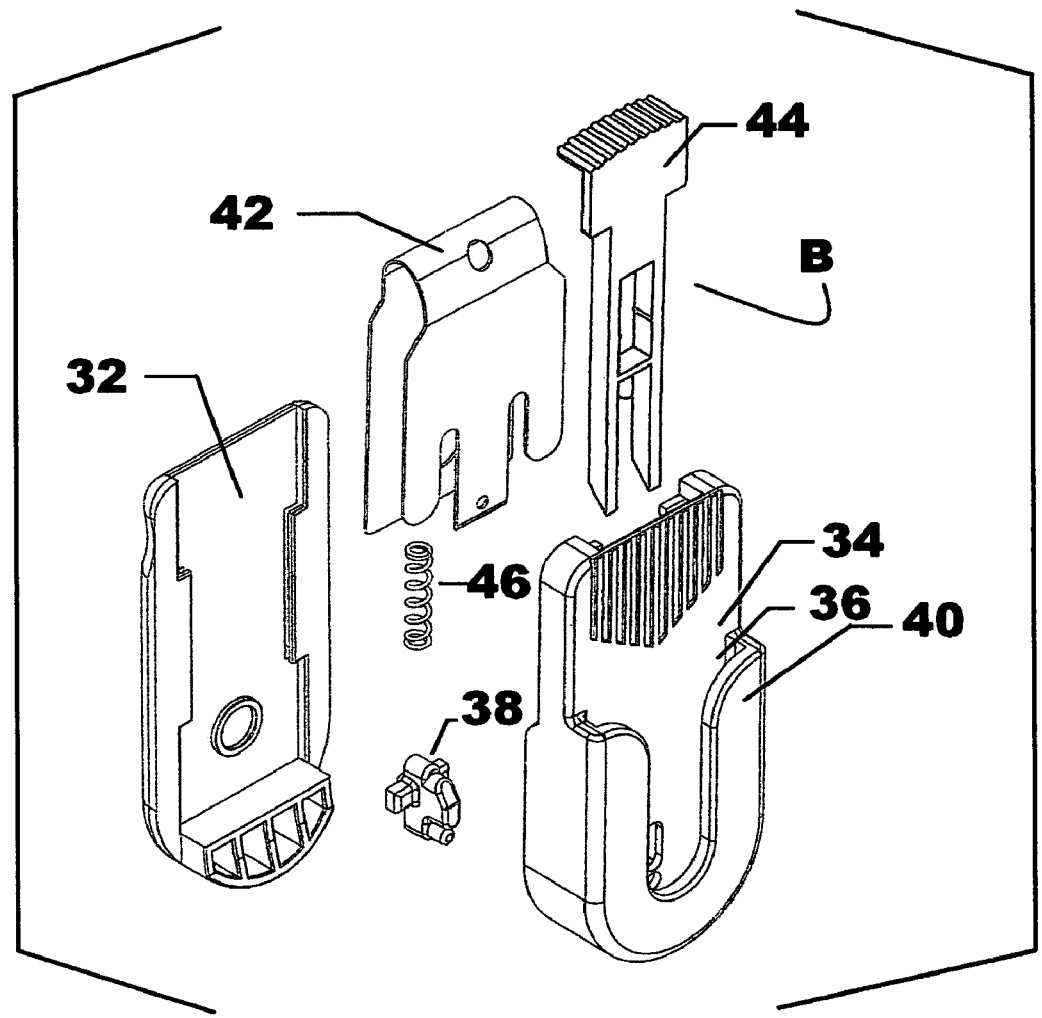
FIG. 5 is a component view of a inverted U-shaped spring hinged catch and catch release belt attachment device.

Referring to FIG. 5, attachment A comprises a front panel 34, a back panel 32, a connecting, inverted U-shaped spring 42 a front plate stud track channel 36 formed by a U-shaped opposing rail retainer 40, a sear release plunger stem 44, a helical internal spring 46, and a sear 38.

Consumer fluids contained within any harbored or docked container create the initial stabilizing swivel weight upon the axis of the a mesial post 22 and distal cylindrical stud button 20 which becomes the benefactor that drives and rotates on the post axial arc, the anti-spill and anti-tip gravity leveling movement. Gravity and the wearers' body movement effect upon the belt clip and the frame a pivotal force transferring motion to the mesial post 22 and distal cylindrical stud button 20 creating the necessary swivel point which is directly related to the purpose and intent of the gravity leveling spill and tipping resistance.

In view of the above, it will be seen that the several objects and advantages of the present invention have been achieved and other advantageous results have been obtained.

Having thus described the invention, what is claimed to be secured by Letters Patent is:

1. The beverage holding device for attaching a beverage to a belt comprising:
    (A) a belt attachment device having a ribbed reinforced front panel having opposed walls which form a U-shaped stud track channel, a back panel for receiving the front panel, an inverted U shaped clip spring, a sear release plunger with reinforced extensions, a helical internal spring, whereby the belt attachment device may be locked onto a belt,
    (B) a one piece cylindrical beverage holding frame made of rigid durable material including and oblate solid cross member plate, opposing proximal rib panels of equal vertical length and width, an annular ring attached to the rib panels, a vertical frame member attached to the annular ring, a mesial cylindrical post attached to the vertical frame member and a distal cylindrical stud button attached to the mesial cylindrical post, (C) wherein the beverage holding frame engages the belt attachment device by sliding the mesial cylindrical post and cylindrical stud button into the U-shaped stud track channel to form a self leveling and tipping resistant, swiveling device that resists unintentional release from the belt or channel when an upward or other directional pressure is applied to the beverage holder when a user assumes a sitting, standing, or other mobile position.

* * * * *